United States Patent [19]

Martin

[11] 4,411,456
[45] * Oct. 25, 1983

[54] APPARATUS, METHODS, AND JOINTS FOR CONNECTING TUBULAR MEMBERS

[76] Inventor: Charles F. Martin, P.O. Box 197, Porter, Tex. 77365

[*] Notice: The portion of the term of this patent subsequent to Jan. 15, 1997, has been disclaimed.

[21] Appl. No.: 112,399

[22] Filed: Jan. 15, 1980

Related U.S. Application Data

[63] Continuation of Ser. No. 673,010, Apr. 2, 1976, Pat. No. 4,183,555.

[51] Int. Cl.³ ............................................ F16L 35/00
[52] U.S. Cl. ................................. 285/39; 285/93; 285/382.4; 285/398; 29/243.52; 29/237; 29/507
[58] Field of Search ..................... 285/382.4, 13, 383, 285/14, 398, 417, 399, 382.7, 334.5, 93, 39, DIG. 25, 101, 371, 382.5; 61/53.5; 29/523, 507, 237, 243.52

[56] References Cited

U.S. PATENT DOCUMENTS

| | | |
|---|---|---|
| 355,644 | 1/1887 | Emery . |
| 527,155 | 10/1894 | Pratt . |
| 704,909 | 7/1902 | Nycum .......................... 285/398 X |
| 1,507,138 | 9/1924 | Pierce .............................. 285/383 |
| 1,516,704 | 11/1924 | Braun . |
| 1,930,745 | 10/1933 | Fisher ............................. 285/383 |
| 1,950,947 | 3/1934 | Mulroyan ...................... 285/382 X |
| 2,649,889 | 8/1953 | Dudley . |
| 2,690,205 | 9/1954 | Stary . |
| 2,737,996 | 3/1956 | Toth . |
| 3,103,068 | 9/1963 | Hinz et al. .................... 285/382.5 X |
| 3,141,685 | 7/1964 | Watts .................................. 285/93 |
| 3,290,770 | 12/1966 | Silverman et al. ............... 285/382.5 |
| 3,434,194 | 3/1969 | Whittaker et al. ................ 29/523 X |
| 3,534,988 | 10/1970 | Lindsey ...................... 285/382.4 X |
| 3,584,950 | 6/1971 | Lennon ...................... 285/382.7 X |
| 3,585,701 | 6/1971 | Stary . |
| 3,683,481 | 8/1972 | Blackburn et al. . |
| 3,736,633 | 6/1973 | Kalen . |
| 3,956,818 | 5/1976 | Houschke ........................... 29/523 |
| 4,183,555 | 1/1980 | Mortin ............................... 285/39 |

FOREIGN PATENT DOCUMENTS 693941  9/1964  Canada ................................... 285/93

*Primary Examiner*—Dave W. Arola
*Attorney, Agent, or Firm*—Browning, Bushman, Zamecki & Anderson

[57] ABSTRACT

Disclosed are apparatus and methods for securing together pipe sections by cold forging the inside end of one or more pipe sections outwardly into a surrounding collar. In the detailed description of an exemplary application, the invention is disclosed for use in connecting together the ends of subsea pipelines, J-tubes and other underwater conduits.

25 Claims, 18 Drawing Figures

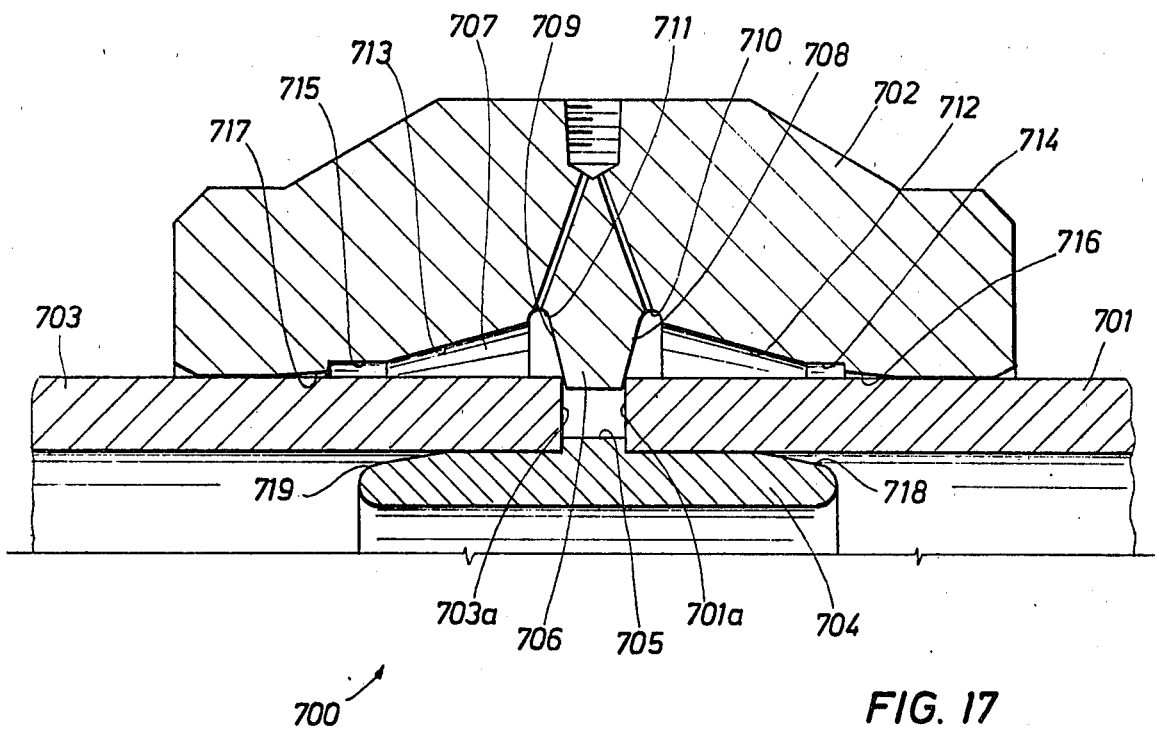
FIG. 17
FIG. 18
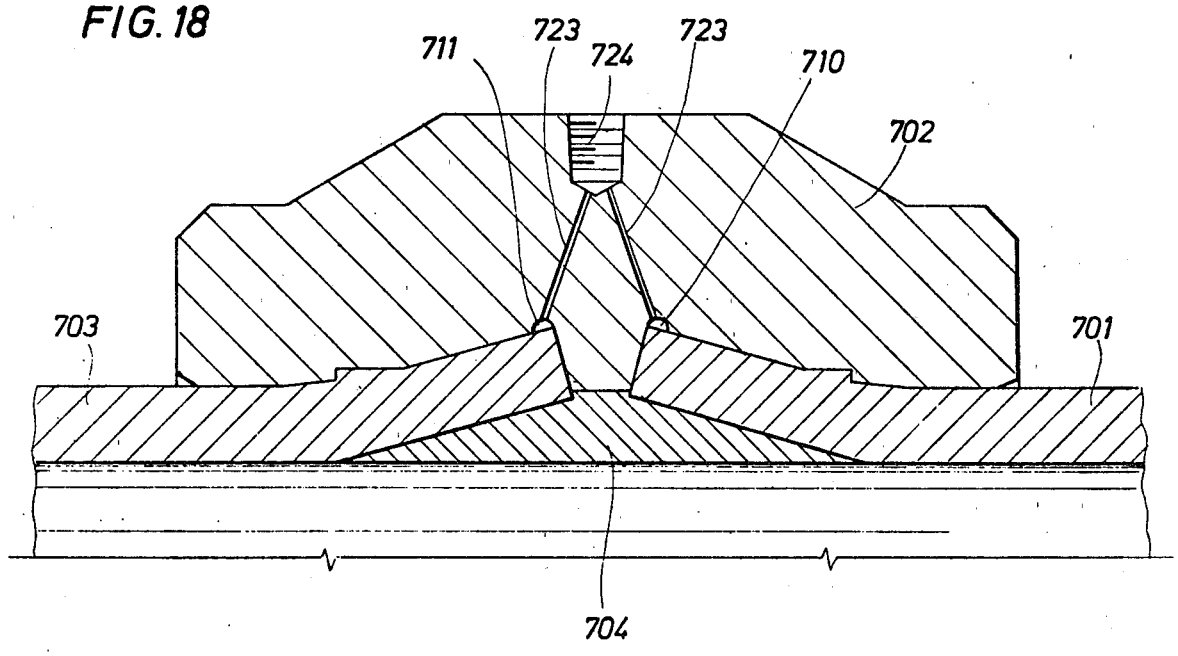

APPARATUS, METHODS, AND JOINTS FOR CONNECTING TUBULAR MEMBERS

This is a continuation of application Ser. No. 673,010, filed Apr. 2, 1976 now U.S. Pat. No. 4,183,355.

BACKGROUND OF THE INVENTION

The invention relates to the field of connecting tubular bodies together to form a confined passage. The specific field of the invention relates to the connection of tubular bodies such as pipes. In the detailed exemplary description to follow, the invention is described for connecting together underwater pipelines, J-tubes and other submerged bodies.

Joining together submerged pipelines has presented special problems because conventional welding techniques and other conventional joining procedures cannot be employed underwater. If conventional welding is to be attempted, as evacuated chamber must be positioned around the area to be welded. These chambers are difficult to manage and in some cases their use is either impractical or impossible.

A variety of mechanical connectors have been employed in an attempt to secure the ends of pipelines together below the surface of the water. These devices are secured to the pipeline ends by mechanical gripping means, in some cases with the use of elastomers or adhesives and by a variety of other means. The resulting joint joint is frequently unreliable because the mechanical means slip, the elastomers fail and leak, the adhesives do not secure or the joint is improperly secured so that no seal is effected. To the extent that conventional connectors have required divers to perform complicated procedures and use clumsy tools, the devices have been unsatisfactory. While divers can perform simple procedures such as threading a nut onto a bolt, more complicated procedures are extremely difficult and time-consuming.

Any joint which has a restricted internal opening is undesirable because it is frequently desirable or necessary to run devices through the pipeline. For this reason, conventional connectors which require internal gripping devices and other means restricting the internal passage of the pipeline are unsatisfactory in many applications.

The problems of attempting to join submerged pipelines are compounded when the ends of the two lines are misaligned. In many cases, the end of the pipelines cannot be shifted and it becomes necessary to connect the ends with a connector which can suitably accommodate the misalignment.

Generally, conventional underwater pipe connectors have been difficult and expensive to use and the joints made by such connectors have been prone to failure.

SUMMARY OF THE INVENTION

Pipe sections are connected together by cold forging the inside end of one pipe section laterally outwardly into a surrounding collar.

In one form of the invention, the collar may be the end portion of a second pipe section so that the forging connects the two sections together. The second section may in turn be one end of a pipeline or may be one end of a flange fitting or one end of another type connector or other device.

In another form of the invention, the collar may be separate from both pipe sections in which case, the ends of both sections are simultaneously forged into the collar to connect the sections together. Indexing means provided within the collar permits the two pipe ends to be properly positioned before the joint is forged.

The collar is preferably provided with an internal recess. When the pipe end is forged into the collar recess, a joint is produced having a metal-to-metal seal with the connected pipe and collar being mechanically locked together by the forged metal.

Filler material, preferably in the shape of a ring, may be positioned in the area of the joints formed by the present invention to assist the forging in locking and holding the sections together or to produce a smooth bore opening through the joint which is of substantially the same size as the opening through the pipe sections, or for both purposes. Indexing means on the filler ensures proper positioning of the filler on both pipe ends before the joint is forged. The filler indexing may also cooperate with collar indexing to provide proper alignment of the pipe ends, the collar and the filler before the joint is forged.

An annular chamber may be formed externally of the joint during the forging procedure. This chamber prevents fluid entrapment which might interfere with the joint formation. Pressurized test fluid may also be applied to the chamber to test the joint for leakage. The test is preferably conducted with the forging assembly in place so that further forging may be quickly and easily performed if the joint is unsatisfactory.

The second pipe section may be a connector which connects the first pipe section to a third pipe section. The connector may be pre-shaped at the surface to acommodate a known misalignment between the first and third pipe sections.

The connector may also include one or more rotational couplings formed by two adjoining curved sections. With the connector in the water, the sections are rotated as required to provide a total curve in the connector which will accommodate the misalignment of the first and third pipe segments. The misaligned pipe segments are secured together through the connector by forging the connector onto the ends of the pipe segments and forging the rotational couplings to form rigid, leakproof joints. The forging assembly may include plural forging means, prepositioned within the connector, so that all of the joints may be formed simultaneously.

Where the joints to be forged are not accessible from the ends of the pipe sections or connector, the necessary power for forging the joints is supplied to the forging assembly through lateral openings in either the pipe sections or the connector. These openings are capped or otherwise sealed when the joint is made and the forging assembly then is moved through the pipe sections to a trap or other access place from which the assembly is removed.

The preferred forging apparatus of the present invention includes a plurality of tapered rollers which are rotated about the internal surface of the joint. The rollers are carried in a mount which is rotated by external powering means. A cone disposed centrally of the rollers is driven longitudinally by hydraulic pressure to force the rollers laterally outwardly. Extremely high, precisely controlled forging forces are obtainable using this apparatus.

From the foregoing, it will be appreciated that the joint of the present invention provides a metal-to-metal seal in which tubular bodies are physically locked together without use of welds, mechanical gripping device, adhesives, elastomers or other similar devices or materials. The joint may include a chamber which permits testing of the joint while the forging equipment employed in forming the joint is still in place. By this means, additional forging forces may be exerted on the joint if leakage is detected. The filler material provided in the joint area assists in locking the joined components together and may also be employed to produce a joint opening which is the same as the opening through the pipe sections. As a result, pigs and other pipeline devices may freely pass through the joint.

The use of pre-curved connectors or adjustable connectors which may be connected by a simple forging process, and then tested for proper sealing, permits misaligned submerged pipe sections to be quickly and easily joined.

The joint, the method of forming the joint and the assembly employed in producing the joint are readily adaptable to underwater environments and may be employed by devices without special equipment of the need for difficult manipulations.

Other features, objects and advantages of the invention will become more readily apparent from the accompanying drawings, specification and claims.

BRIEF DESCRIPTION OF THE DRAWINGS

FIGS. 17 and 18 are partial vertical cross sections, before and after forging, respectively, illustrating yet another form of the joint of the present invention.

DESCRIPTION OF THE ILLUSTRATED EMBODIMENTS

Figure 1:
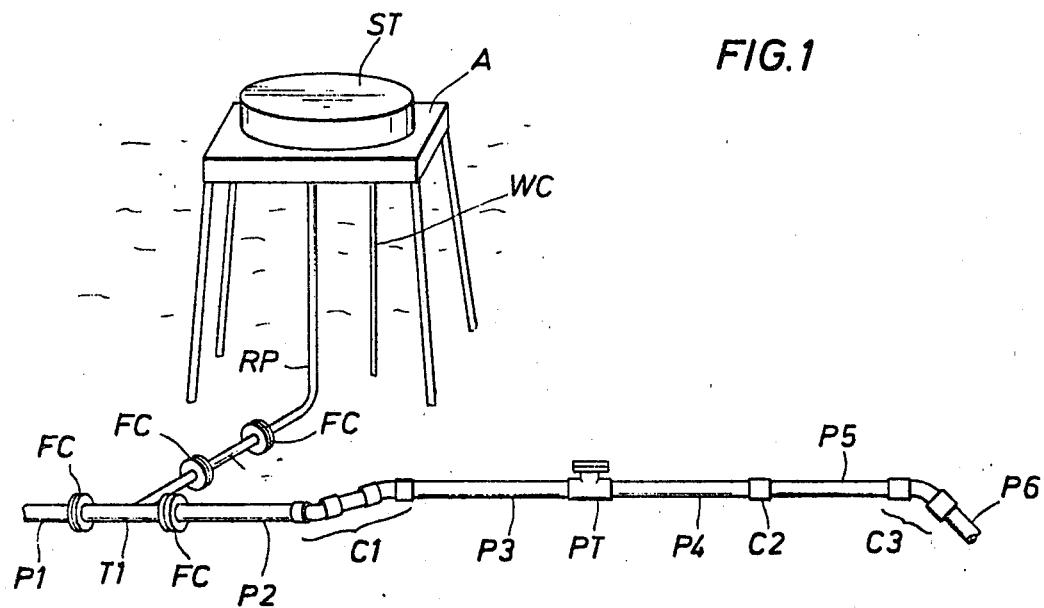
FIG. 1 is a perspective view illustrating a submerged pipeline and J-tube connection employing the joint of the present invention.

FIG. 1 is a schematic representation depicting exemplary applications of the method and apparatus of the present invention. In the application illustrated in FIG. 1, the invention is employed to connect together underwater pipeline sections and other underwater conduits. The Figure illustrates a production platform A on which is mounted a storage tank ST which receives oil from a well conduit WC. The oil in the storage tank is transferred via a riser pipe RP to a submerged pipeline segment S which connects through a T fitting T1 to a submerged pipeline indicated generally at P.

The pipeline P is comprised of a series of pipe sections P1, P2, P3, P4, P5, and P6. The pipe sections are connected together by a variety of coupling or joint devices which are formed by the method of the present invention and employ joints and apparatus of the present invention. Similarly, the connection between the riser pipe RP and the submerged pipe section S as well as the connection of the section S to the connector T1 employ the teachings of the present invention.

The connections between the riser pipe RP and the submerged section S are provided by mating flange connectors FC. Similar flange connectors FC connect the section S to the T-connector T1 which in turn is connected through flange connectors FC to the pipe sections P1 and P2. Pipe sections P2 and P3 are misaligned on the sea floor and are connected together by an adjustable curve connector C1. As will be described, the connector C1 can be manipulated by a diver to accommodate the misalignment between the pipe sections P2 and P3.

A pig trap PT connects sections P3 and P4 and is employed to insert or remove physical devices from the pipeline which are employed for measuring the pipeline or which may be employed in accordance with the teachings of the present invention to form the connector joints which secure the pipeline segments together.

A midline connector C2 connects pipe section P4 with pipe section P5. A fixed curved connector C3 joins misaligned sections P5 and P6. The connector C3 is preformed at the surface and has a fixed curvature to accommodate a known or predetermined misalignment between the pipe sections P5 and P6.

Each of the connections illustrated in FIG. 1, and a variety of others, may be made using the joints, apparatus and methods of the present invention.

Figure 2:
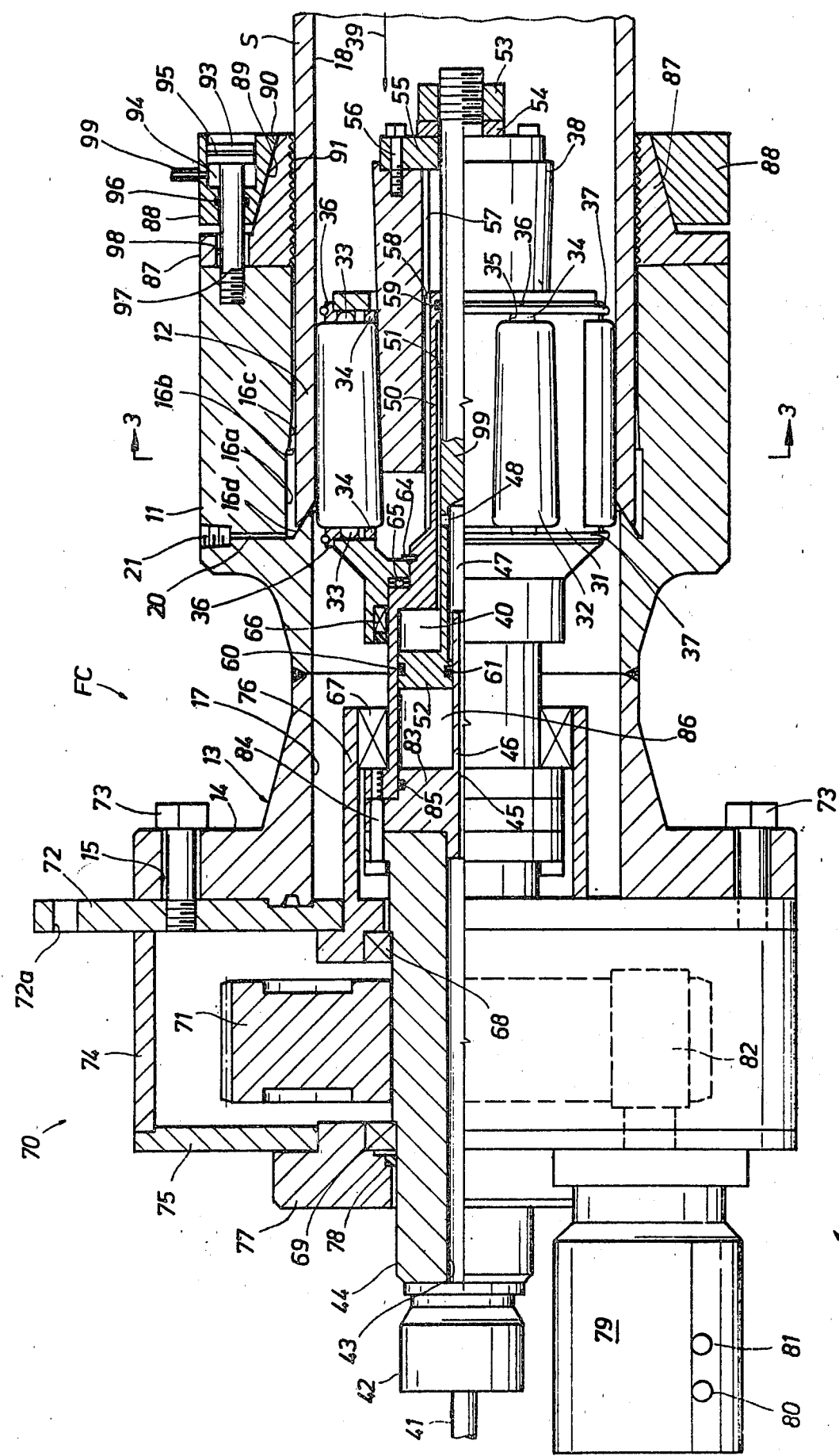
FIG. 2 is a side elevation in quarter section and partially broken away illustrating a forging assembly forging the end of a pipe section into the end collar of a flange connector.

FIG. 2 illustrates details of the invention as it is employed to connect a flange connector onto the end of a first tubular body, such as the pipe section S. The flange connector FC is a tubular body which has an end portion or collar 11 disposed over the end portion 12 of the pipe section S. The opposite end portion 13 of the flange connector FC includes a conventional flange plate 14 which is provided with a plurality of circumferentially disposed, longitudinally extending bores 15. The bores 15 are employed in customary fashion to receive bolts (not illustrated) for securing the flange plate 14 to a similar, opposing flange plate included at the end of a mating flange connector.

A locking recess 16 is formed along the internal surface of the collar 11. In the form of the invention illustrated in FIG. 2, the recess is substantially annular and includes a substantially cylindrical surface 16a, a shoulder 16b, a slightly inclined surface 16c and an undercut surface 16d. When the end portion of the pipe section S is inserted into the end opening of the collar 11, an overlapping joint area is formed between the two bodies. Registry of the end of the pipe section S with the undercut section 16d provides a stop which ensures proper relative positioning between the pipe section and collar as required to form a correct joint. As will hereinafter be more fully explained, forging of the pipe section end portion 12 into the collar 11 in the overlapping joint area provides a substantially smooth internal surface between a central, longitudinally extending passage 17 formed in the flange connector FC and a central, longitudinally extending passage 18 formed in the pipe section S.

Figure 4:
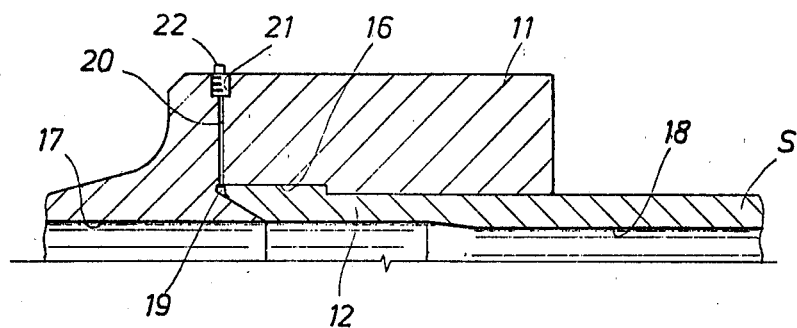
FIG. 4 is a partial vertical cross section of the joint formed by the apparatus of FIG. 2.

The internal surface of the joint is best illustrated in FIG. 4 as it appears following the forging operation. An annular chamber 19 is formed externally of the passage 18 when the joint is formed. As will be appreciated from inspection of FIG. 4, the end of the pipe section S cooperates with the configuration of the recess 16 to form the annular chamber which encircles the joint. A passage 20 extending through the collar 11 functions as an access means to the chamber 19. The access means 20 provides pressure communication between the chamber 19 and an area external to the chamber to prevent entrapment of fluid within the joint during the joint formation and to permit pressure testing of the joint while the forging apparatus is still in position.

An internally threaded receptacle 21 formed in the collar 11 is connected to an hydraulic line (not illustrated in FIG. 4) during the forging of the joint. The hydraulic line functions to bleed off pressure developed in the fluids trapped between the collar 11 and pipe S as the joint is being forged. Thereafter, pressure applied through the hydraulic line is employed to test the sealing ability of the joint. After a successful joint is formed, the hole 21 is closed with a threaded plug 22.

Figure 3:
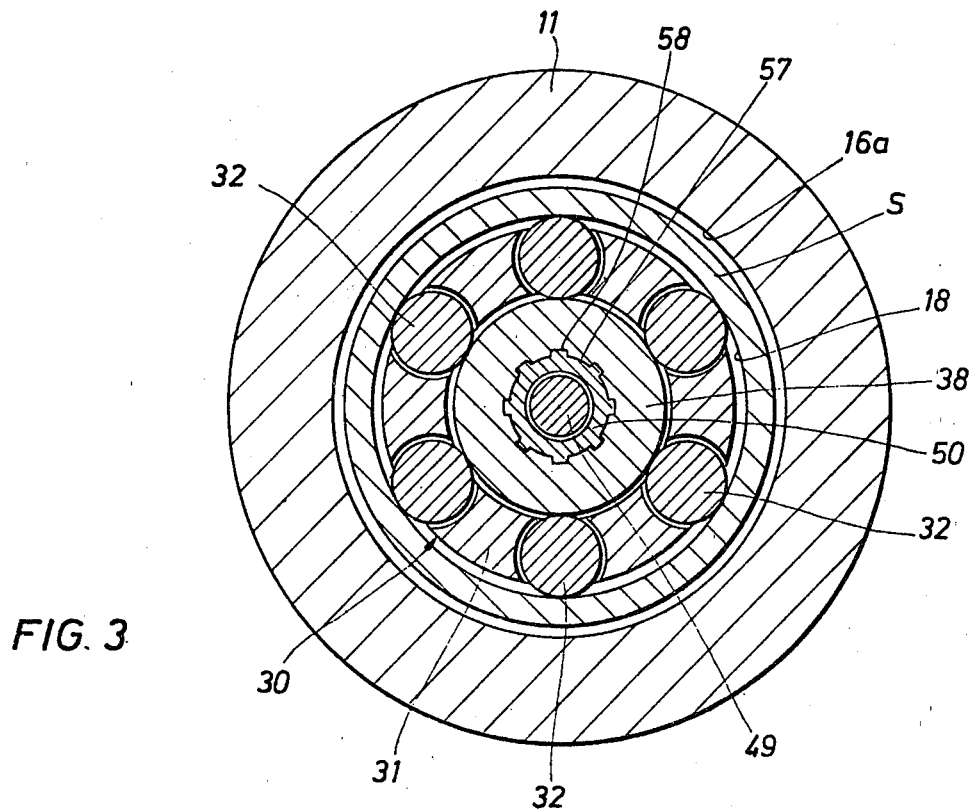
FIG. 3 is a vertical cross section taken along the line 3—3 of FIG. 2.

One form of the forging apparatus of the present invention is indicated generally at 30 in FIGS. 2 and 3. The apparatus 30, like other embodiments of the invention described herein, is employed for exerting a laterally outwardly directed forging force on the internal surface of a surrounding body. In FIGS. 2 and 3 of the drawings, the primary surrounding body is the pipe section S which is being forged into the surrounding collar 11.

The forging apparatus 30 includes a rotatable mounting body or cage 31 within which are mounted a plurality of tapered rollers 32 constructed in the form of truncated, right circular cones. The rollers are mounted for rotation along this longitudinal axis within the cage 31. During the forging operation, the rollers 32 are forced laterally outwardly into rolling engagement over the internal surface of the surrounding tubular body. Each roller is equipped with end pins 33 which are received within semi-circular mounting plates 34. The plates 34 are in turn received within semi-circular recesses 35 formed in the cage 31. Axially extending pins 36 extending from the plates 34 are held laterally inwardly by a garter spring 37 which encircles the cage and engages each of the pins 36 and each of the plates 34. The mounting assembly comprised of the end pins 33, plates 34, recesses 35, pins 36 and springs 37, are exemplary of means for holding the rollers 32 in place to prevent them from falling out of the forging assembly 30. The mounting assembly also permits the rollers to be easily removed and replaced as may be required for repair or to forge different size joints. Any suitable means, however, may be employed for these purposes provided only that the rollers 32 are rotatably mounted, positioned and retained within the cage 31 as required to exert the necessary forging forces onto the surrounding tubular body.

The forging assembly 30 includes a centrally positioned, truncated, right circular drive cone 38. The outer conical surface of the drive cone diverges from its central axis along the same angle of divergence present in the outer conical surface of the rollers 32. The outer conical surfaces of the rollers ride against the outer conical surface of the cone 38 with the tapers of the rollers and the taper of the cone being oppositely disposed so that the rollers contact the surrounding tubular body which is to be forged along tangential lines which are parallel to the central axis of the tubular body.

The cone 38 is movable longitudinally relative to the rollers 32. Because of the taper in the surfaces of the cone and rollers, longitudinal movement of the cone in the direction of the arrow 39 causes the rollers to be moved laterally outwardly. The cooperating action between the rollers and cone provides extremely large radially directed forging forces which may be precisely controlled by altering the longitudinal position of the cone relative to the rollers.

Longitudinal movement of the cone 38 in the direction of the arrow 38 is effected by applying pressurized hydraulic fluid to an annular expansion chamber 40. The fluid is initially admitted to the forging assembly 30 through a hydraulic line 41 which connects through a hydraulic swivel 42 to a central bore 43 in a tubular shaft 44. The swivel 42 is a conventional apparatus which provides a sealed transfer link between the stationary, non-rotating hydraulic line 41 and the rotating shaft 44. Fluid in the bore 43 is communicated through a transfer bore 45 in a transfer tube 46 to a longitudinal opening 47 and radial opening 48 formed in a center shaft 49. The shaft 49 extends through a splined connector sleeve 50. An annular opening 51 formed between the sleeve 50 and the shaft 49 completes the fluid path to the chamber 40.

The application of fluid pressure to the fluid chamber 40 exerts a force on an annular piston 42 forming one portion of the expansion chamber 40. The pressure differential acting across the piston 52 moves the shaft 49 in the direction of the arrow 39. This movement is transmitted through a nut 53 threaded to the end of the shaft 49 to an annular spacer 54 and to a torque plate 55. Bolts 56 secure the torque plate 55 to the cone 38. Spline elements 57 formed internally of the cone 38 mate with spline elements 58 formed on the external surface of the sleeve 50 to permit relative longitudinal movement between the sleeve and cone while preventing relative rotational movement between the two components. O-ring seals 59, 60 and 61 form sealing and sliding engagement between the components which are engaged by these seals to provide a pressure-tight fluid path to the chamber 40 while simultaneously permitting relative longitudinal displacement between the components.

The body 31 is fixed longitudinally onto the sleeve 50 by a snap ring 64. A thrust bearing 65 is positioned between the two components to permit relative rotational movement between the two and to acommodate the axially directed forces induced during the forging process. A bearing seal 66 isolates the bearing 65 to assist in keeping it clean.

Rotary bearings 67 and 68 and 69 support the rotatable portions of the forging apparatus 30 within a surrounding, relative stationary holding assembly 70. The holding assembly 70 is employed to secure the forging assembly 30 to the flange connector FC and to house a ring gear 71 employed to impart rotary motion to the shaft 44. The assembly 70 includes a base plate 72 which is secured to the opening 15 in the flange plate 14 by bolts 73. The bolts are required only to hold the assembly 70 in place and may be of the type which may be positioned and removed by hand, without the need for a wrench or other tool. An opening 72a in the plate 72 is employed as an attachment means for a line which is used to assist in lowering and properly positioning the forging assembly.

The base plate 72 cooperates with side walls 74 and a rear plate 75 to form a rectangular, box-like housing positioned over the ring gear 71. A centering guide 76 is bolted or otherwise suitably secured centrally of the base plate 72 and a second centering guide 77 is suitably secured to the rear plate 75 to provide alignment and support for the shaft 44. The rotary bearings 68 and 69 assist in maintaining the shaft in place and reducing the frictional forces between the rotating shaft and the stationary holding assembly. An annular seal ring 78 positioned about the shaft 44 and held in place within the centering guide 77 prevents water and debris from entering the ring gear housing.

The holding assembly 70 comprises a part of the forging assembly 30 and the components of both are connected together to form a composite, unitary assembly which is removable from the flange connector FC by removal of the bolts 73. Similarly, when placing the forging assembly 30 in position, the end of the assembly, including the rollers 32, is introduced into the opening of the flange connector FC and pushed forward until the base plate 72 engages the flange plate 14. The bolts 73 are then positioned to hold the forging assembly in place as illustrated in FIG. 2.

Rotary power is applied to the ring gear 71 by one or more hydraulic motors 79 which are bolted onto the rear plate 75. Ports 80 and 81 to the motor 79 are employed in customary fashion to communicate pressurized fluids to the motor for powering the assembly. The motor 79 rotates a pinion gear 82 which is engaged with the ring gear 71. Suitable gearing means (not illustrated) are employed to provide the required power reduction between the motor 79 and the pinion gear 82. While only one motor 79 is illustrated, it will be appreciated that two or more such motors may be employed.

Rotation of the pinion gear 82 rotates the ring gear 71 which is keyed or otherwise rigidly fixed to the shaft 44 causing the shaft to rotate also. Shaft rotation is transmitted through a connector piece 83 secured to the shaft 44 by bolts 84 which also are engaged with the base of the spline connector sleeve 50. Accordingly, as the ring gear 71 rotates, the sleeve 50 also rotates which in turn functions through the splined connection with the cone 38 to impart rotary motion to the cone. Rotation of the sleeve 50 rotates the cone 38 which, because of its touching engagement with the rollers 32, causes the rollers to rotate and move along the internal surface of the pipe section S. This roller movement in turn causes the mounting body 31 to rotate relative to the splined sleeve 50.

An O-ring seal 85 positioned between the connector 83 and the sleeve 50 cooperates with the O-ring seal 62 and the piston seals 61 and 60 to define a compression chamber 86. This chamber is charges with air, for example to a pressure of approximately 100 psi, and functions as a return mechanism for returning the piston 52 in a direction opposite to that of the arrow 39 when the pressure of the hydraulic fluid in the chamber 40 is relieved. Return of the cone to its extreme right-hand position as viewed in FIG. 2 assists in removing the assembly 30 from the joint area after the joint has been forged. It will be understood that the position of the piston relative to the sleeve 50 illustrated in FIG. 2 is an intermediate position and that when the hydraulic pressure acting in the chamber 40 is relieved sufficiently, the piston 52 will move to the extreme righthand edge of the chamber 40 causing the cone to move to its extreme righthand position.

During the forging operation, forces are induced in the flange connector FC which would tend to rotate it relative to the pipe section S. To prevent this rotation, a plurality of slip segments, for example 6, are positioned along the base of the collar 11. A slip bowl 88 having an internally tapered wedging surface 89 is positioned over oppositely inclined wedging surfaces 90 formed on the slip segments 87. As the bowl 88 is moved longitudinally relative to the slip segments 87 in the direction of the arrow 39, laterally inwardly directed forces are exerted on the slip segments causing teeth 91 along the lower internal surfaces of the slips 87 to bite into the outer surface of the pipe segments S. A gripping force is thereby produced which holds the slips stationary relative to the pipe section S. Longitudinal forces are applied to the slip segments by hydraulic pressure which acts within longitudinal bores 92 formed in the base of the slip bowl 88. These bores cooperate with piston heads 93 to form a chamber 94 which is sealed by O-ring seals 95 and 96. A connecting shaft 97 extending from the piston head 93 is threadedly engaged to the base of the collar 11 to hold the piston head stationary relative to the collar. The shaft 97 passes through an oversized bore 98 in the slip segment 87 to permit longitudinal movement of the slip relative to the shaft.

Hydraulic fluid is supplied to the chamber 94 by a hydraulic line 99. The application of pressurized hydraulic fluid to the chamber 94 forces the slip bowl 88 in the direction of the arrow 39. This movement functions through the contacting, wedging surfaces 98 and 90 to exert a laterally inwardly directed force on the slip members 87 causing the teeth 91 to firmly grip the external surface of the pipe section S. A plurality of such chamber and piston assemblies are preferably provided in the slip bowl 88 to apply a uniform gripping force around the assembly. The described assembly thus functions when hydraulic fluid is applied to the line 99 to prevent relative movement between the flange connector FC and the pipe section S.

Operation of the Embodiment of FIGS. 2, 3 and 4

With the pipe section S on the bottom of a water body, it may be desirable to excavate, with a jetting means or otherwise, a large cavity to provide adequate room for equipment and personnel. Once the end of the pipe section S is accessible, the pipe end is internally tapered as illustrated in FIG. 2 using any suitable conventional grinding or cutting means or other suitable means. (In certain of the joints to be hereinafter described, there is no necessity to bevel the ends of the pipe section.)

The flange connector FC is positioned over the pipe section S as illustrated in FIG. 2 with the bevelled end of the pipe section in engagement with the undercut surface 16d so that the flange connector and end of the pipe section S are properly indexed. Hydraulic pressure is then applied to the conduit 99 to cause the flange conductor to be rigidly secured to the pipe section S. The forging assembly 30 is then inserted into the end of the flange connector and the bolts 73 are positioned to hold the assembly in place as illustrated in FIG. 2. The pressurized gas in the chamber 86 maintains the cone 38 in its extreme right-hand location so that the rollers 32 are free to retract radially as they are positioned within the end of the pipe section S. During the insertion procedure, the garter springs 37 function to urge the rollers radially inwardly and hold the rollers in place within the cage 31.

Fluid pressure is supplied through the hydraulic line 41, the hydraulic swivel 42, central shaft bore 43, transfer bore 45, opening 47, radial opening 48, and annular opening 51 to the chamber 40. Pressurized fluid acting in the chamber 40 drives the piston 52 in the direction of the arrow 39. Piston movement is transferred through the center shaft 49 to the nut 53, spacer 54 and transfer plate 55 which engages the large diameter end of the cone 38. As the cone 38 moves in the direction of the arrow 39, it draws the outer conical surface of the cone into engagement with the outer conical surface of the rollers 32. This in turn causes the rollers 32 to move laterally outwardly into firm engagement with the internal surface of the end portion 12 of the pipe section S. Hydraulic power is then applied to the motor 79 through the ports 80 and 81 causing the pinion gear 82 to rotate the ring gear 71. Rotation of the ring gear causes the shaft 44 to rotate which in turn imparts rotary motion through the bolts 84 and connector 83 to the connector sleeve 50. This rotational movement acts through the spline connectors 57 and 58 to impart rotary motion to the cone 38.

Rotation of the cone 38 against the rollers 32 causes the rollers to rotate, which in turn causes the cage 31 to rotate relative to the sleeve 50. The hydraulic power applied through the line 41 and to the motor 79 is continued as required to force the rollers outwardly sufficiently for forging the pipe end 12 into the collar recess 16. While the joint is being forged, the access means 20 is employed to permit escape of any trapped fluid between th pipe end 12 and the collar 11. When the joint has been forged into the configuration illustrated in FIG. 4, a connector (not illustrated) secured in the threaded socket 21 is employed to apply hydraulic fluid pressure to the access means 20 which in turn communicates with the annular chamber 19. If the joint between the pipe end 12 and collar 11 is inadequate, the pressure of the fluid in the chamber 19 will decrease during the test period. If this occurs, the forging operation is repeated, if desired, using additional laterally directed forging forces by increasing the pressure of the hydraulic fluid supplied through the line 41. The test is again repeated to verify formation of a good joint. If the joint will still not hold pressure along the chamber 19, the forging procedure is again repeated. When a good joint is obtained, the hydraulic line connected to the socket 21 is removed and the plug 22 is threaded into place to seal the access opening 20 and chamber 19.

When the joint has been successfully forged, the hydraulic pressure in the line 41 is terminated causing the compressed air in the chamber 86 to force the piston 52 and the cone 38 in the direction opposite to the direction of the arrow 39. By thus displacing the cone relative to the rollers 32, the rollers are freed to move laterally inwardly. Transfer tube 46 functions to maintain the required pressure seal in the chamber 86 as the piston 52 moves to its bottom position where the chamber 40 contains its minimum volume. The transfer tube correspondingly functions to assure adequate pressure communication between the hydraulic fluids supplied from the line 41 to the pressure chamber 40 when the piston 52 is at the far righthand extreme of its motion.

With the pressure in the chamber 40 released, the bolts 73 are removed and the forging assembly is extracted from the flange connector FC. The hydraulic connectors to the chambers 94 are disconnected and the joint is complete. Thereafter, a second flange connector may be mated against the plate 14 and suitable rings, bolts and other customary components may be employed to securely connect the mating flange connectors together in a leakproof joint.

If desired, the slip and bowl assemblies may be removed for use in forming a second connector. To this end, the slip bowl 88 is comprised of a series of segments rather than a continuous annular body. The locking assembly is removed by unthreading the shafts 97 which release the slip segments and bowl segments from engagement with the collar 11.

Alternate Embodiments

Figure 5:
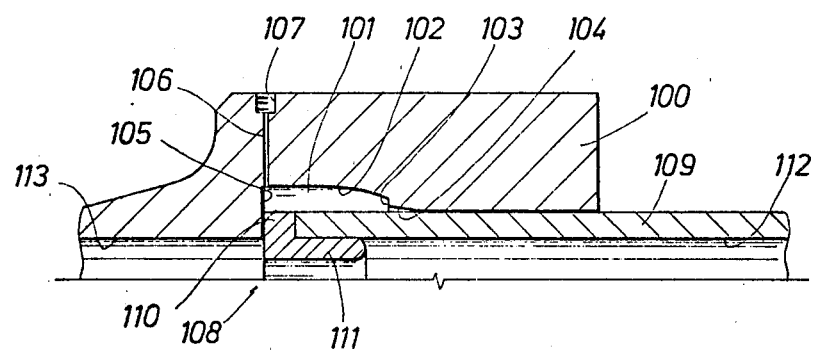
FIG. 5 is a partial vertical cross section illustrating components included in a modified joint of the present invention.
Figure 6:
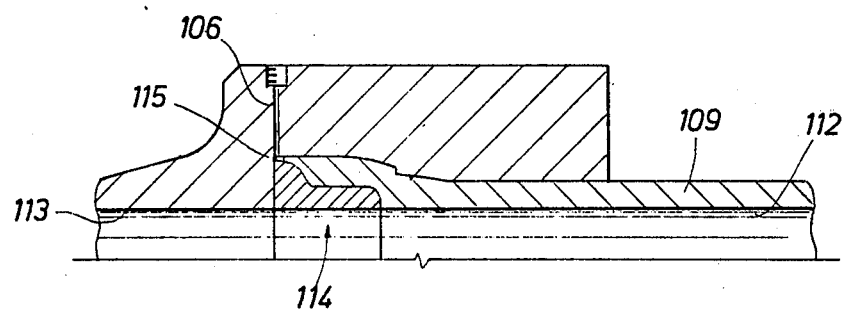
FIG. 6 is a view similar to FIG. 5 illustrating the joint after forging.

FIGS. 5 and 6 illustrate a modified joint assembly which may be employed with the present invention. The joint may be formed using the forging assembly 30 described with reference to the FIGS. 2, 3 and 4 and following the method described with respect to such figures. The modified joint of FIGS. 5 and 6 includes an annular collar 100 which is similar to the collar 11 of FIGS. 2-4. The collar 100 is equipped with a locking recess 101 which includes a first curved section 102, a shoulder 103, a second curved section 104 and an end shoulder 105. An access passage 106 communicates with a threaded bore 107 for the same purpose as described previously with reference to the joint illustrated in FIGS. 2-4.

An annular filler means indicated generally at 108 is positioned at the end of a tubular body 109. The filler means 108 includes an outwardly extending rim 110 and annular body portion 111. The rim 110 is positioned between the end of the body 109 and the recess shoulder 105. The shoulder 105 thus functions as an indexing means which ensures that the filler 108 and pipe 110 are in proper relative position. The rim 110 also functions to ensure that the filler 108 is properly positioned relative to the end of the tubular body 109 and the recess 101.

Forging the joint using the forging apparatus 30 in the manner previously described produces a joint as illustrated in FIG. 6. In this joint, the body 109 has an internal flow passage 112 which has the same lateral dimensions as the longitudinal opening 113 extending through the collar 100. When the joint is forged using a forging means such as the apparatus 30, the joint passage indicated generally at 114 has substantially the same lateral dimensions as both the opening 112 and the opening 113. This is accomplished with assistance from the filler means 111 which, during the forging procedure, fills in the void provided by the recess 101.

The filler means 108, which is removably received within the body 109 cooperates with the end of the body 109 and the contour of the recess 101 to leave a chamber 115 after the forging has been accomplished. The chamber 115 is annular and communicates with the access means 106 to provide an escape passage for trapped fluids and to permit testing of the joint.

The collar 100 shown in FIG. 5 may be connected to one end of a pipe section, to a flange plate or to any other type body. Similarly, the body 109 may be the end of a pipeline, or a fitting which in turn is connected to another fitting means, or other device.

Figure 7:
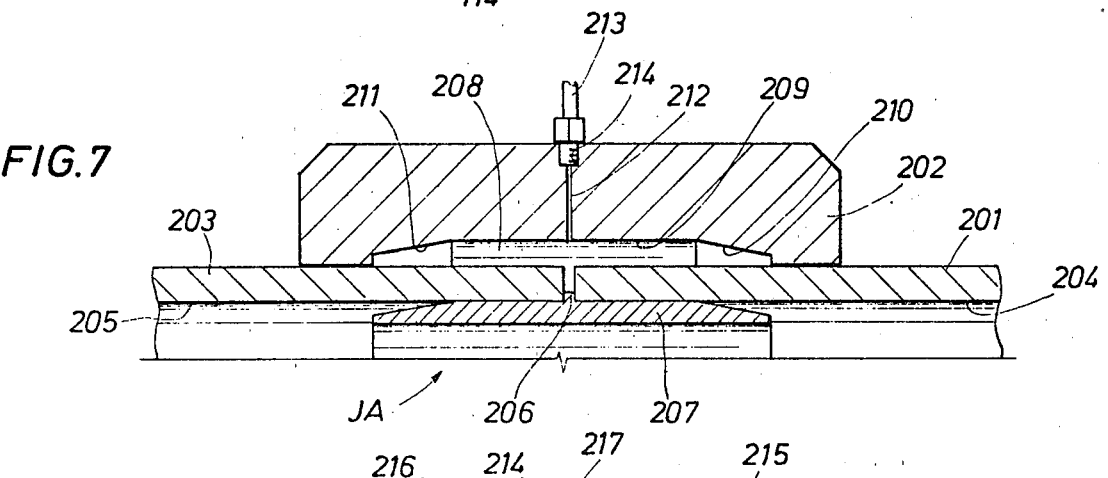
FIG. 7 is a partial vertical section illustrating a modified form of the invention employed as a midline connector.
Figure 8:
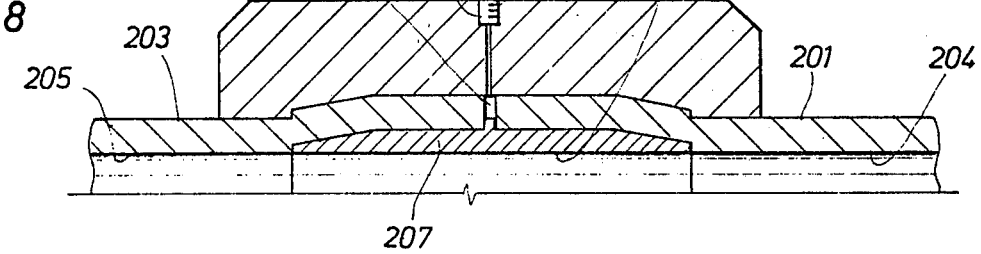
FIG. 8 is a view similar to FIG. 7 illustrating the joint after forging.

FIGS. 7 and 8 illustrate another embodiment of the invention in which three tubular bodies are connected together using the forging apparatus and technique of the present invention. The connector of FIGS. 7 and 8 may be of the type indicated as C2 in FIG. 1.

If the joint illustrated in FIGS. 7 and 8 is to be employed, for example, as a midline connector to form the connector C2, a modified forging apparatus, similar to those to be hereinafter described, is employed for providing the forging force. Such modified forging means are required, for example, where the pipe end is not readily accessible as in the case of the joint described with reference to FIGS. 2-4.

In the embodiment of FIGS. 7 and 8, a first tubular body 201 is shown received within one end of a second tubular body or collar 202. A third tubular body 203 is received in the opposite end of the collar 202. A longitudinal central passage 204 extends through the body 201 and a similar passage 205 extends through the body 203. The bodies 201 and 203 may be, for example, pipe segments at the end of submerged pipelines. Of course, it will be appreciated that the bodies 201 and 203 may be any other tubular bodies which are to be joined together.

The ends of the bodies 201 and 203 engage an annular indexing ridge 206 formed along the external surface of an annular filler means 207 which is received within the end openings of the two bodies. The second body or collar 202 includes a locking recess 208 formed along the internal surface of the collar. The recess 208 includes a cylindrical surface 209 disposed between tapered surfaces 210 and 211 at each end of the recess. An access opening 212 extends radially through the collar 202 from the locking recess 208. A hydraulic line 213 is sealingly engaged with an internally threaded bore 214 to provide fluid communication between the access opening 212 and the hydraulic line.

The assembly illustrated in FIG. 7 provides an overlapping joint area JA comprised of the ends of the pipe segments 201 and 203 within the collar 202. The joint is formed by forging the filler means 207 and the ends of pipe segments 201 and 203 laterally outwardly in this overlapping joint area and into the locking recess 208 as illustrated in FIG. 8. A resulting joint opening 215 is produced which has the same lateral dimensions as the openings 204 and 205 in the joined pipe segments.

A chamber 216 is also formed between the outer surface of the ridge 206, the ends of the pipe segments 201 and 203 and the cylindrical surface 209 of the collar 202. The chamber 216, which is annular and extends completely around the joint, is employed for testing and to prevent fluid entrapment. When the proper joint has been formed, a plug 217 is threaded into the bore 214 to seal the passage.

Figure 9:
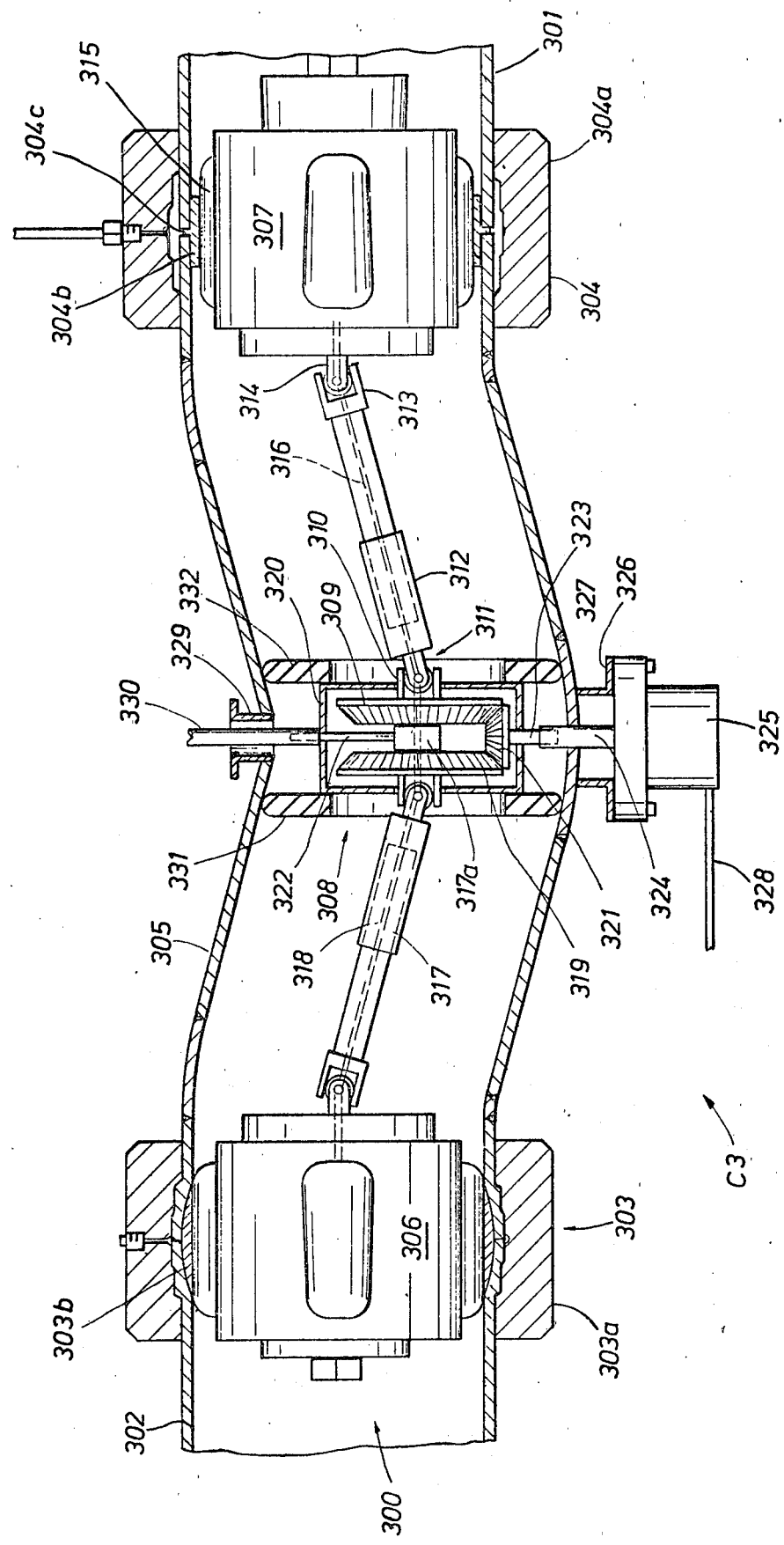
FIG. 9 is a horizontal cross sectional view illustrating a modified forging assembly and preformed connector employed to secure the ends of two misaligned pipe sections together.

FIG. 9 illustrates a modified form of the invention in which a modified forging apparatus 300 is employed to form a connection, such as the connection C3, for the purpose of connecting together misaligned pipe segments 301 and 302. To this end, midline connectors 303 and 304 are employed to secure a precurved pipe segment 305 to the ends of pipe segments 301 and 302. The joints 303 and 304 are similar to the joint illustrated with reference to FIGS. 7 and 8. The curved pipe segment 305 is welded together or otherwise shaped to accommodate the misalignment between pipe segments 302 and 301. Where the pipe segments 301 and 302 are submerged pipelines or conduits, the section 305 is fabricated above water using conventional welding or other conventional pipe forming techniques. The forging assembly 300 is then positioned within the pipe segments 305 at the surface and the composite assembly is lowered through the water into position between pipe segments 301 and 302.

The forging assembly 300 includes a forging head 306 illustrated in forging position within the joint 303 and a second forging head 307 illustrated in forging position within the joint 304. A central drive and supply assembly indicated generally at 308 is employed to supply rotary mechanical power and pressurized hydraulic fluid to the forging heads 306 and 307. Mechanical power is supplied to a ring gear 309 which acts through a shaft 310 to impart rotary motion through a universal joint, indicated generally at 311, to a slip spline 312. The slip spline in turn acts through a second universal joint 313 to rotate a central drive shaft 314.

The shaft 314, when rotated, functions like the shaft 44 described with reference to FIG. 2, causing a central drive cone in the head 307 to rotate and in turn impart rotary motion to a plurality of conical rollers 315. Hydraulic fluid for longitudinally moving the cone in the head 307 is supplied by a conduit 316 which extends through the shaft 314, through the universal joint 313, through the slip spline 312, through the universal joint 311, and through the ring gear 309 to a rotating hydraulic swivel 317a. The conduit includes flexible sections in the areas of the U-joints 311 and 313 and telescoping segments within the spline 312 so that the spline may be elongated and foreshortened and the conduit may be flexed and bent without loss of fluid pressure in the conduit 316. Devices of this type are conventional and well known and any suitable means for transporting the necessary mechanical and hydraulic power to the forging heads may be employed. The operation of the forging head 307 is identical to that described previously with reference to the forging assembly illustrated in FIGS. 2 and 3 with the exception that the power and hydraulic fluid are supplied differently.

The forging head 306 which is identical to the forging head 307, but oppositely disposed, is propelled by a slip spline 317 and supplied by a hydraulic line 318. A ring gear 319 rotates the spline 317 which in turn rotates the drive cone included in the forging head 306.

The ring gears 309 and 319 are mounted within a rigid housing 320. A pinion gear 321 engages both of the ring gears. When the gear 322 rotates a counterrotating movement is imparted to the two ring gears. Thus, for example, if the ring gear 309 is rotated in a clockwise direction, the ring gear 319 is rotated in a counterclockwise direction. The rotary hydraulic swivel 317 is conventional and operates to maintain fluid connection between the rotating hydraulic conduits 316 and 318 and a stationary inlet supply line 322.

A square shaft 323 fixed to the base of the pinion gear 321 engages a square hole formed in a drive sleeve 324 so that rotary motion in the sleeve 324 is imparted to the shaft 323 and in turn to the pinion gear 321 for effecting the described counterrotation of the ring gears 319 and 309. The sleeve 324 is a part of a hydraulic motor drive assembly 325 which is bolted onto a flange plate 326 in a lateral connector opening 327. A hydraulic line 328 supplies pressurized hydraulic fluid to the motor 325 which energizes the motor which in turn imparts rotary motion to the drive sleeve 324.

A second lateral connector opening 329, disposed diametrically across from the opening 327, receives a hydraulic supply line 330 which slips over the end of the inlet supply line 322. Hydraulic fluid supplied by the line 330 is transmitted through the line 322, to the rotary hydraulic swivel 317a and the tubes 318 and 316 to the two forging heads. The entire assembly 308 is centralized within the pipe segment 305 by rubber discs 331 and 332.

Operation of the Embodiment of FIG. 9

Assuming that two misaligned pipe segments are to be connected below the surface of the water, an access hole is preferably excavated in the water bottom to provide ample room for the men and equipment to be employed in forming the connection. The pipe segment 305 is preformed at the surface and the forging assembly 300 is positioned within the segment with the forging heads 306 and 307 being pushed inwardly toward the drive and supply assembly 308. In this configuration, the slip splines 312 and 317 are fully collapsed so that the forging heads are completely contained within the precurved pipe segment 305.

The collar portion 304a of the joint 304 is positioned over the pipe segment 301 and the end collar section 303a of the joint 303 is positioned over the pipe segment 302. The pipe segment 305 is then placed between the ends of segments 301 and 302 and the collar segments 304a and 303a are centered over the joint area as illustrated in FIG. 9. The supply line 330 is inserted through the lateral opening 329 and positioned over the inlet line 322. The drive sleeve 324 is inserted into the lateral opening 327 and over the square drive shaft 323. The motor 325 is then bolted onto the flange 326 of the opening 327 to hold the motor in place.

Hydraulic pressure is applied from the line 330 and is imparted to the tubes 316 and 318. This hydraulic pressure initially causes the splines 312 and 317 to elongate which in turn forces the forging heads 306 and 307 out of the pipe segment 305 and into the positions illustrated in FIG. 9. Stops (not illustrated) are provided on the spline shafts 312 and 317 to ensure that the forging heads are pushed to the correct position for forming the joints 303 and 304. These stops are set at the surface using any conventional means.

With the forging heads positioned as illustrated in FIG. 9, hydraulic pressure is again supplied through the line 330 to cause the drive cones in both of the forging heads to force the rollers radially outwardly into the overlapping joint area. Hydraulic fluid power is supplied through the line 328 to supply the motor 325 which in turn forces the sleeve 324 to rotate. Rotation of the sleeve 324 causes the shaft 323 to rotate which in turn rotates the pinion gear 321 effecting counterrotation of the ring gears 319 and 309. Thus, the forging heads 306 and 307 are supplied with rotating mechanical power and hydraulic power for exerting laterally outwardly directed forces on the rollers in each of the forging heads. By this means, the joints 304 and 305 are forged in the manner described with reference to the previous embodiment.

For purposes of illustration, FIG. 9 illustrates the joint 303 as it appears when forged and joint 304 as it appears before the joint is forged. In practice, it will be appreciated that both joints will be forged simultaneously. The counterrotation of the two forging heads produced during the forging steps produces offsetting torque forces which prevent the assembly 308 from rotating. The rigidity of the drive sleeve 324 also assists in preventing rotation of the entire forging assembly 300 within the pipe segment.

While a conventional filler means 304b with an indexing means 304c may be employed at one end of the connection, provision is made at the opposite end for use of a filler means 303b which has no indexing ridges to be positioned after the pipe sections 302 and 305 are in place. This is done by temporarily affixing the filler means 303b centrally over the rollers of the forging head 306. The filler means 303b is properly positioned in the overlapping joint area when the forging head is pushed into its forging position. The forging step overcomes the temporary adhesive or fixing means so that the forging head may be retrieved leaving the filler forged in place. It will be appreciated, also, that if necessary, a joint similar to that described in FIGS. 2–4 may be employed without the use of a filler means. Other suitable joints of the type hereinafter described may also be employed.

After the joints 303 and 304 have been formed, the line 330 is removed from the opening 329 and the motor 325 and shaft 324 are removed from the lateral opening 327. Metal flange plates (not illustrated) are bolted or otherwise secured to the lateral openings to seal off the passages. The entire forging assembly 300 is then pumped or otherwise displaced through the pipe segments 301 or 302 to a pig trap or other recovery place where it is removed from the pipeline.

Figure 10:
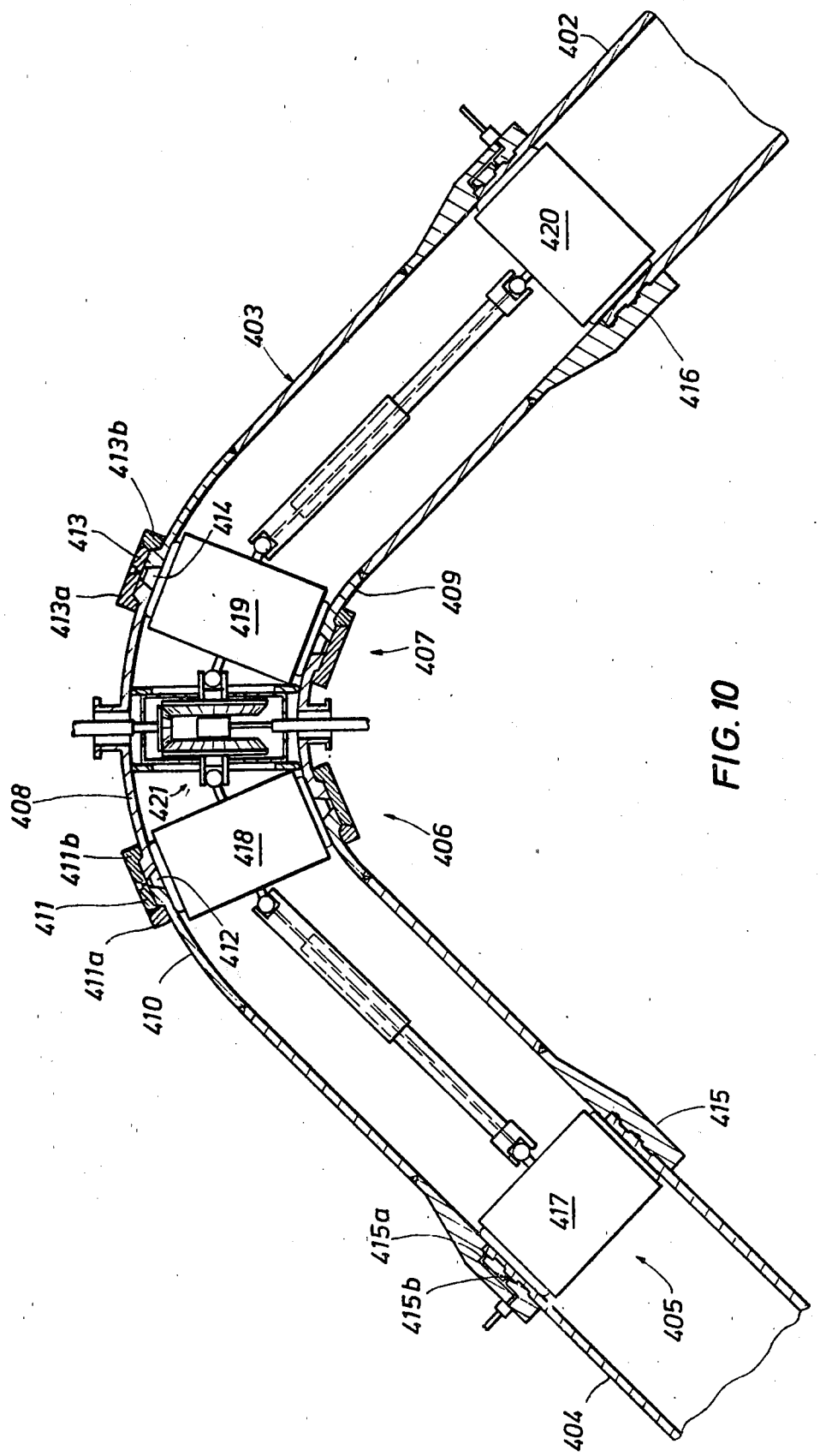
FIG. 10 is a horizontal cross sectional view illustrating another modified forging assembly and an adjustable connector used to connect two misaligned pipe segments together.

FIG. 10 illustrates a modified connector of the invention in which a first pipe segment 402 is secured to a second pipe segment 403 which in turn is connected to a third pipe segment 404. The connector of FIG. 10 is of the type indicated at C1 in FIG. 1. The segment 403 is adjustable so that its total curve may be altered to accommodate the misalignment between the pipe segments 402 and 404. A modified forging assembly, indicated generally at 405, is employed in forging the multiple joints employed in the connection. The pipe segment 403 includes two rotational couplings indicated generally at 406 and 407. The coupling 407 connects together a first curved rotational section 408 and a relatively rotational section 409. The coupling 406 connects together the section 408 and a relatively rotational section 410. The ends of the sections 410, 408 and 403 are enlarged and are loosely received within locking recesses in the joints 406 and 407. The joints 406 and 407 initially retain the sections together, while permitting relative rotational movement between the sections.

The joint 406 includes a collar 411 comprised of parts 411a and 411b, welded together to form the locking recess which holds the enlarged end of the connected segments 408 and 410. An annular filler means 412 is positioned between the segments. Similarly, components 413a and 413b are welded together to form a collar 413 which holds together the enlarged ends of the pipe sections 408 and 403 in the joint 407. An annular filler 414 is disposed between the ends of the two pipe sections. The end joints include a collar section 415 at the end of the pipe section 410 and a collar section 416 at the end of the pipe section 403.

Forging heads 417, 418, 419, and 420 are driven by a power and supply assembly 421 in a manner similar to that described previously with respect to the assembly of FIG. 9. Suitable linking means are provided between the assembly 421 and the various forging heads to transmit rotary mechanical power and hydraulic fluid pressure to the forging heads in a manner similar to that previously described.

The assembly of FIG. 10 permits the pipe segment 402 and the pipe segment 404 to be connected even though the precise misalignment between the two is not known before the connector 403 is put in place. This is effected by rotating the segments 409, 408 and 410 relative to each other within the collars 411 and 413 until the segment 403 attains a desired total curve sufficient to join the segments 402 and 404. Thereafter, hydraulic power supplied to the assembly 421 causes the heads 417 and 420 to extend into proper position within the joints 415 and 416. The heads 418 and 419 are prepositioned and fixed within the segment 403 before the segment is lowered into the water.

The application of rotary motion to the assembly 421 causes the forging heads to exert radially outwardly directed forging forces which in turn form secured, sealed joints at each of the overlapping joint areas. The heads 419 and 420 rotate in one direction and the heads 417 and 418 rotate in the opposite direction. The forged joints are tested as previously described and reforged if necessary. Once the forging occurs, the joints 406 and 407 are no longer relatively rotational and a tight fluid joint is formed between the rotational sections. The hydraulic supply and mechanical supply lines are removed from the assembly when the joints have been properly formed. The lateral access openings are sealed and the forging apparatus 405 is removed from the pipeline. Components and procedures employed in the form of the invention illustrated in FIG. 10 but not expressly described are similar to corresponding components and procedures described elsewhere herein.

It may be noted that a modified form of joint is illustrated in the joints 415 and 416. In these forms of the joint, plural access openings such as 415a and 415b are connected to the external test line to prevent fluid entrapment and to also permit testing of the joint. It will be appreciated that the internal flow passage formed within the joint 415 and the joint 416 will be slightly larger than that of the adjoining pipe segment. By contrast, the passages through the joints 406 and 407 will have the same lateral dimensions as that of the adjoining pipe segments because of the presence of the filler material. Other joints of the present invention may also be employed in the connector if necessary or desirable.

Figure 11:
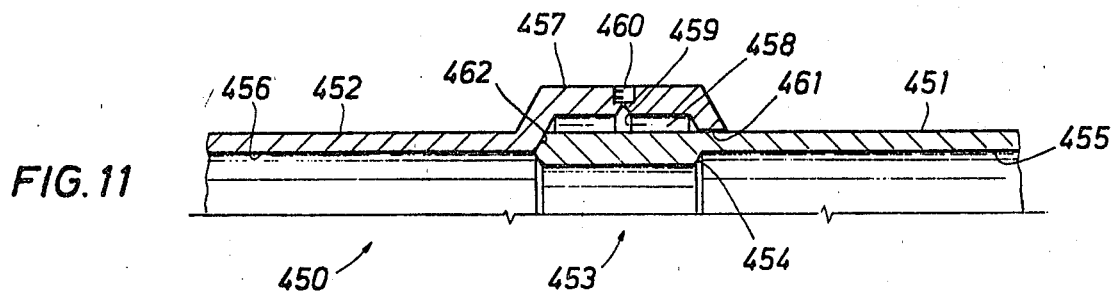
FIGS. 11 and 12 are partial vertical cross sections, before and after forging, respectively, illustrating a modified joint according to the present invention.
Figure 12:
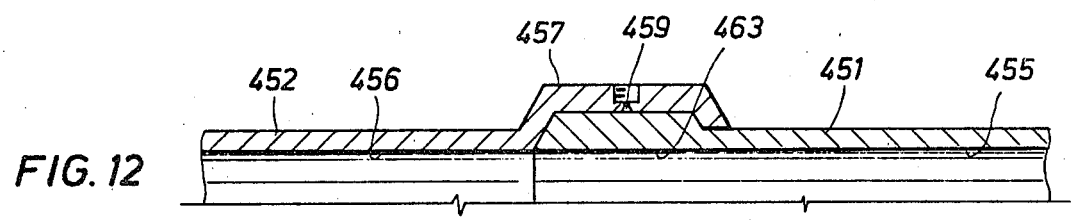

A modified joint of the present invention is illustrated generally at 450 in FIG. 11. A first tubular body 451 is to be joined with a second tubular body 452. The overlapping joint area indicated generally at 453 includes a filler means 454 which is integrally formed with the tubular body 451. The filler means 454 is in the form of an annular internal ridge which projects inwardly from a longitudinally extending passage 455 included in the first body. The passage 455 has the same lateral dimensions as a longitudinally extending flow passage 456 formed internally of the body 452. An annular collar 457 is integrally formed at the end of the tubular body 452. The collar 457 includes an annular internal locking recess 458 which accommodates the material included in the filler means 454 and the end portion of the tubular body 451 which is forged outwardly during the forging procedure. An annular channel 459 formed along the internal surface of the collar 457 cooperates with an access means 460 to provide a fluid vent and a test chamber in the manner and for the purposes previously described. The outside diameter of the members 451 and 452 are the same and the end opening 461 of the collar is of the same size so that the tubular body 451 is receivable within the end of the body 452. The opposite internal surface 462 of the collar 457 functions as an indexing means to assist in properly positioning the end portion, including the filler means 454, of the tubular body 451 within the collar 457.

During the forging procedure, a forging means is disposed within the end of the body 451, internally of the filler means 454. The forging means forges the filler 454 and the end of the body 451 laterally outwardly into the recess 458. The dimensions of the recess 458 are such as to receive so much of the filler means and the end of body 451 as is required to form an internal opening 463 through the joint of substantially the same lateral dimensions as those of the passages 455 and 456. The forging thus produces a tight, locked-together joint between the bodies 451 and 452. The annular groove 459 forms a chamber with the external surface of the tubular body 451 so that the fluid trapped between the end portion and the overlying collar may be communicated to an area external to the chamber and further permits testing of the joint to ensure proper sealing.

Figure 13:
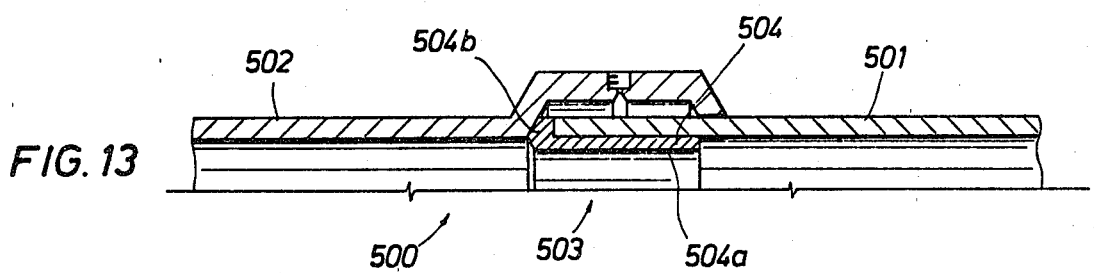
FIGS. 13 and 14 are partial vertical cross sections, before and after forging, respectively, illustrating still another joint of the present invention.

FIG. 13 illustrates a modified joint of the present invention indicated generally at 500. The joint 500 is similar to the previously described joint 450 with the exception that first and second tubular bodies 501 and 502 include an overlapping joint area 503 in which a filler means 504 is separate from the first and second bodies. The filler 504 is an annular member which has a tubular body portion 504a received within the end portion of the body 501 and an external rim section 504b which produces the same effective function as the previously described joint 450. The advantage of the joint 500 is that the unmodified end of a pipe segment 501 may be equipped with the removable filler means whereas the joint 450 requires preforming of the end portion of the tubular body to provide a filler means.

Figure 14:
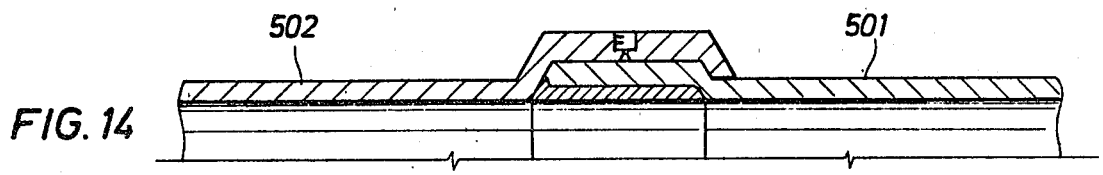

FIG. 14 illustrates the joint after forging. As with the previously described joint 450, the internal passage through the joint has the same lateral dimensions as the flow passage through the joint pipe segments 501 and 502. In other respects, the joint 500 is similar to the joint 450.

Figure 15:
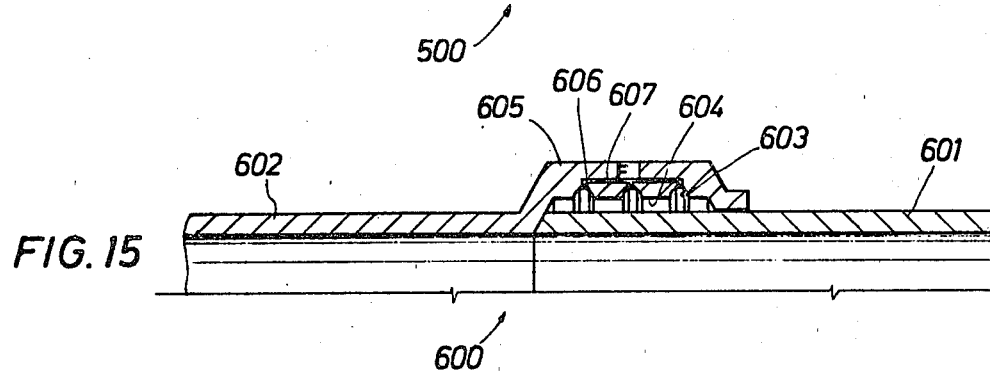
FIGS. 15 and 16 are partial vertical cross sections, before and after forging, respectively, illustrating still another form of the joint of the present invention.
Figure 16:
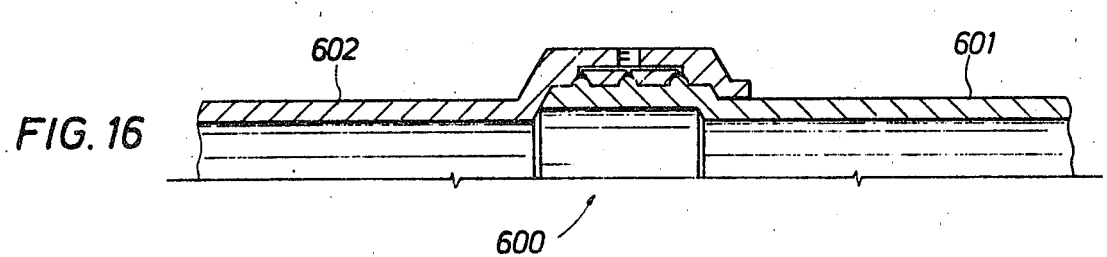

FIGS. 15 and 16 illustrate still another embodiment of the joint of the present invention indicated generally at 600. The joint 600 employs no filler means so that the resulting joint passage has a larger lateral opening than the longitudinal flow passages through the joined tubular bodies 601 and 602. A plurality of grooves 603 are formed along the internal surface of a locking recess 604 provided within a collar 605 which is integrally formed with the tubular body 601. Chamber grooves 606 communicate through access passages 607 with the external area of the collar 605 to provide venting and testing functions as previously described.

The forged joint is illustrated in FIG. 16. The several recesses 603 assist in locking the two bodies 601 and 602 together and further assist in providing a leakproof seal in the joint.

FIGS. 17 and 18 illustrate a modified joint of the present invention generally at 700. The joint 700 is employed to secure together a first tubular body 701, a second tubular body or collar 702 and a third tubular body 703. As with the previously described embodiments, the tubular body 701 and/or 703 may be the ends of pipelines, the ends of flange connectors, or may be tubular portions of any other device. An annular filler means 704 is positioned within the end portions of both of the bodies 701 and 703. An indexing ridge 705 formed along the external surface of the filler means 704 functions as a stop which properly indexes the end portions of the tubular bodies 701 and 703 relative to the filler means 704. An internal annular projection 706 extending radially inwardly from a locking recess 707 in the collar 702 similarly functions as a stopping means which indexes the end portion of the bodies 701 and 703 relative to the collar 702.

In assembling the joint 700, the collar 702 is first placed over the end portion of the tubular body 701, the filler means 704 may then be positioned within the end portion of the tubular body 701 or may be previously disposed therein, or if desired, may be disposed within the end portion of the tubular body 703. The body 703 is then inserted into the opposite end of the collar 702 so that the components of the joint assembly are in the positions illustrated in FIG. 17.

The indexing ridge 706 includes tapered side surfaces 708 and 709. These end surfaces are designed to fit smoothly against the end surfaces 701a and 703a, respectively, of the tubular bodies 701 and 703 when the joint is forged. Annular grooves 710 and 711 are formed along the internal surface of the recess 707 to function as exhaust conduits and to form a portion of the test chamber for the purposes previously described. Oppositely tapered surfaces 712 and 713 within the recess 707 each meet, respectively, with cylindrical surfaces 714 and 715 which in turn each respectively meet with smaller tapering surfaces 716 and 717. These surfaces provide an internal locking recess which has a contour designed specifically to receive the outwardly forged ends of the tubular bodies 701 and 703 to provide a superior joint. Similarly, the external end surfaces of the filler means 704 are tapered as at 718 to assist in providing superior joining and sealing properties in the joint 700.

FIG. 18 illustrates the joint after formation with the central flow passage through the joint having the same lateral dimensions as the central flow passage through the tubular bodies 701 and 703. The annular grooves 710 and 711 cooperate with the ends of the tubular bodies to form chambers which communicate with an area external to the joint through access openings 722 and 723. As with the previously described embodiments, once the joint is properly formed, a plug or other device is inserted into an internally threaded socket 724 to seal the access openings.

The foregoing disclosure and description of the invention are illustrative and explanatory thereof, and various changes in the invention may be made within the scope of the appended claims without departing from the spirit of the invention. Thus, by way of example rather than limitation, while the invention has been described for underwater, it may also be employed to advantage in connecting such conduits above water. Thus, use for surface pipeline connections or to join pipe on a surface vessel before the pipe is lowered into the water are well within the scope of the present invention. Similarly, the invention may be used to fabricate structures such as offshore production platforms and other structures which employ interconnected tubular bodies in their construction.

I claim:

1. An assembly for connecting together tubular bodies to provide a passageway through the connected bodies, comprising:
   first and second tubular bodies, each of which includes at least one end portion having an annular end face and an end opening in communication therewith, the bore of the end portion of the second body being greater than the outside dimensions of the end portion of the first body so that the first body end portion is receivable within the second body end portion to form an overlapping joint area between the said first and second bodies;
   indexing means for limiting axially inward movement of the first body end portion into the second body end portion such that said first body annular end face is completely received in said second body end portion;
   means operatively connected to said first and second bodies and carried by one of said tubular bodies to restrain relative rotational and axial movements of said end portions after said overlapping joint area is formed; and
   forging means releasably mounted on one of said tubular bodies and having a rotatable forging head receivable within the bore of said first body end portion for forging the first body end portion laterally outwardly, in the overlapping joint area, into locking engagement with the second body end portion.

2. The assembly of claim 1 wherein the bore of said second body end portion includes an annular locking recess for accommodating material forged laterally outwardly by said forging head to lock said bodies together.

3. The assembly of claim 1 further including means for forming a chamber external to said second body and in pressure communication with said overlapping joint area.

4. The assembly of claim 1 including filler means located in the bore of said first body end portion within said overlapping joint area, said filler means being forged laterally outwardly with said first body.

5. The assembly of claim 4 wherein said filler means is an annular member.

6. The assembly of claim 4 wherein said filler means is an annular member separate from said first and second bodies.

7. The assembly of claim 1 wherein said forging head includes a mounting means rotatable within said first body end portion,
   a plurality of rollers rotatably carried by said mounting means, extending means for forcing said rollers laterally outwardly, and
   means for rotating said mounting means as said rollers are extended.

8. The assembly of claim 1 further including:
   a third tubular body having an end portion the outside dimensions of which are less than the bore of the second body end portion so that the third body end portion is receivable within the second body end portion to form a second overlapping joint area.

9. The assembly of claim 8 wherein:
   said first and third bodies are longitudinally extending pipe segments with central flow passages; and
   said second body is a collar adapted to fit concentrically over adjoining ends of said pipe segments.

10. The assembly of claim 1 wherein said means operatively connected to said first and second bodies to restrain relative movements comprises a slip-type gripping means.

11. The assembly of claim 10 wherein said gripping means is fluid activated and is further operative to urge said indexing means axially into engagement.

12. A method of connecting together the end portions of first and second tubular bodies have annular end faces to provide a passageway through the connected bodies, the bore of the end portion of the second body being greater than the outside dimensions of the end portion of the first body so that the first body end portion is receivable within the second body end portion, comprising the steps of entering at least part of said first body end portion into the bore of said second body end portion so that said end portions have an overlapping joint area and said first body annular end face is completely received in said second body end portion, thereafter forming a preliminary connection between said tubular bodies thereby restraining relative rotational and axial movements of said end portions, releasably mounting a forging means with a rotatable forging head on one of said tubular bodies, engaging the rotatable forging head with the first body end portion in the overlapping joint area, and forging the first body end portion laterally outwardly into locking engagement with the second body end portion.

13. The method of claim 12 further including the step of forging said first body end portion laterally outwardly into a locking recess formed in said second body end portion.

14. The method of claim 12 wherein said forging includes the step of rolling a plurality of rollers over the internal surface of said first body end portion while said rollers are forced laterally outwardly.

15. The method of claim 10 wherein there are filler means within said overlapping joint area, said filler means being forged laterally outwardly with said first body.

16. The method of claim 15 further including the step of forging said filler means and said first body end portion laterally outwardly until the continuous passageway formed by said joint has substantially the same lateral dimensions throughout its length.

17. The method of claim 15, wherein the filler means is a component separate from said first body.

18. The method of claim 12 further including the step of applying pressurized fluid externally of said joint area to test for joint leakage after the forging step and repeating the forging step if leakage is detected.

19. The method of claim 12 wherein said first and second tubular bodies are at least partially submerged in water.

20. The method of claim 12 further including the steps of:
placing the end portion of a third tubular body into said second body end portion to form a further overlapping joint area; and
foring said first and third bodies laterally outwardly in both said overlapping joint areas for forming a joint between said first, second and third bodies.

21. The method of claim 20 wherein said first and third tubular bodies are pipe segments and said second tubular body is a collar adapted to fit over adjoining ends of said pipe segments.

22. The method of claim 21 further including the steps of:
supplying power to the forging means through one or more lateral openings formed in said pipe segments,
removing said forging means from said pipe segments after completion of the forging step,
and sealing said lateral openings after said joint is formed.

23. The method of claim 21 wherein one of said pipe segments is curved.

24. The method of claim 23 wherein said curved pipe segment includes two relatively rotatable curved sections and at least one rotational coupling, and said method includes the further steps of:
altering the total curve in said curved pipe segment by rotating said sections relative to each other to a desired position and thereafter,
forming a sealed joint of said rotational coupling by forging said rotational coupling together.

25. The method of claim 24 wherein said curved pipe segment includes a plurality of relatively rotatable curved sections with rotatable couplings and said method includes the steps of:
altering the total curve in said curved pipe segment by rotating the sections at each rotational coupling relative to each other to a desired position, and thereafter
forming a sealed joint of each of said rotational couplings by forging said rotational couplings together.

* * * * *